US010831398B2

(12) United States Patent
Barzik et al.

(10) Patent No.: US 10,831,398 B2
(45) Date of Patent: Nov. 10, 2020

(54) STORAGE DEVICE EFFICIENCY DURING DATA REPLICATION (71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Maxim Kalaev, Petach Tikva (IL); Deborah A. Messing, Beit Sehemesh (IL)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/268,741

(22) Filed: Sep. 19, 2016

(65) Prior Publication Data
US 2018/0081548 A1  Mar. 22, 2018

(51) Int. Cl.
*G06F 15/16* (2006.01)
*G06F 3/06* (2006.01)
*H04L 29/08* (2006.01)

(52) U.S. Cl.
CPC .............. *G06F 3/065* (2013.01); *G06F 3/064* (2013.01); *G06F 3/067* (2013.01); *G06F 3/0608* (2013.01); *H04L 67/1095* (2013.01); *H04L 67/1097* (2013.01)

(58) Field of Classification Search
CPC ...... G06F 3/065; G06F 3/0608; G06F 3/0619; G06F 3/064; G06F 3/0644; G06F 3/067; H04L 67/1095; H04L 67/1097
See application file for complete search history.

(56) References Cited

U.S. PATENT DOCUMENTS

| 5,915,094 A | 6/1999 | Kouloheris et al. |
| 6,134,596 A | 10/2000 | Bolosky et al. |
| 6,993,539 B2 * | 1/2006 | Federwisch ......... G06F 11/2066 |
| 7,502,849 B2 * | 3/2009 | Roberts .................. H04L 29/06 370/235 |

(Continued)

FOREIGN PATENT DOCUMENTS

WO   WO1994019748   *  9/1994

OTHER PUBLICATIONS

Kim et al., "AndroBench: Benchmarking the Storage Performance of Android-Based Mobile Devices", Frontiers in Computer Education, AISC 133, pp. 667-674, springerlink.com, Springer-Verlag Berlin Heidelberg 2012.

(Continued)

*Primary Examiner* — Chirag R Patel
*Assistant Examiner* — Rachel J Hackenberg
(74) *Attorney, Agent, or Firm* — Rakesh Roy (57) ABSTRACT

Improving storage device efficiency during data replication. An asynchronous data replication process is initiated between a source computer and a target computer over a network. Performance of the target computer and a storage device of the target computer is monitored. At least one portion of data stored on the source computer is identified for the data replication, wherein the at least one portion of the data is organized in a data block. Whether to modify a size of the data block is determined, based on the monitored performance of the target computer. Responsive to determining to modify the size of the data block, based on the monitored performance of the target computer, the size of the data block is modified.

20 Claims, 6 Drawing Sheets

(56) References Cited

U.S. PATENT DOCUMENTS

| | | | |
|---|---|---|---|
| 7,818,309 B2 | 10/2010 | Browne et al. | |
| 8,468,312 B2 | 6/2013 | Benhase et al. | |
| 8,819,344 B1 | 8/2014 | Faibish et al. | |
| 9,075,528 B2 | 7/2015 | Huang | |
| 9,268,652 B1* | 2/2016 | Salyers | G06F 11/1464 |
| 9,385,749 B1* | 7/2016 | Nam | H03M 7/6082 |
| 9,712,401 B2* | 7/2017 | Wright | H04L 41/5067 |
| 10,565,058 B1* | 2/2020 | Meiri | G06F 16/27 |
| 2013/0117286 A1* | 5/2013 | Gallant | G06F 7/24 707/752 |
| 2017/0163728 A1* | 6/2017 | Chawla | G06F 3/0619 |

OTHER PUBLICATIONS

Disclosed Anonymously, "A Method and System for Optimal Routing of Input/Output Data for Business Intelligence Queries", IP.com No. IPCOM000240794D, pp. 1-4.

Mell et al., "The NIST Definition of Cloud Computing", National Institute of Standards and Technology, Special Publication 800-145, Sep. 2011, pp. 1-7.

* cited by examiner

STORAGE DEVICE EFFICIENCY DURING DATA REPLICATION

BACKGROUND

The present invention relates generally to the field of data replication, and more particularly to improving the efficiency of disk access for a storage device of a target computer during a data replication process.

Storage devices, such as hard disk drives (HDDs), solid state drives (SSDs), and storage controllers, may store data received from various sources. A storage device may include a number of sectors, or a subdivision of a track on a magnetic disk, flash cells, or other media. Each sector may store a fixed amount of user-accessible data. For example, traditional 512 byte sectors include a gap section, sync section, address mark section, data section, and error correction code (ECC) section. Recent advancements in storage device technology increased the size of these sectors on many storage devices, allowing access to 4096 byte sectors (4 k sectors), which improves format efficiency and a more robust ECC section. It may be common for 4 k sectors to internally emulate 512 byte sectors (i.e., 512e, or 512 Emulated drives) by performing read-modify-write operations. Other storage devices only support using 4K sectors (4 Kn, or 4K Native drives).

Data replication between storage systems is an advanced storage feature which allows replicating data between two storage systems, namely a source system and a target system, either synchronously or asynchronously. Asynchronous data replication is performed by updating changes made to data on the source system to the target system within a time frame and transferring these changes as Input/Output (I/O) operations from the source system to the target system.

SUMMARY

Embodiments of the present invention provide systems, methods, and computer program products for improving storage device efficiency during data replication. An asynchronous data replication process is initiated between a source computer and a target computer over a network. Performance of the target computer and a storage device of the target computer is monitored. At least one portion of data stored on the source computer is identified for the data replication, wherein the at least one portion of the data is organized in a data block. Whether to modify a size of the data block is determined, based on the monitored performance of the target computer. Responsive to determining to modify the size of the data block, based on the monitored performance of the target computer, the size of the data block is modified.

DETAILED DESCRIPTION

Recent advancements in storage device technology increased the common sector size for many storage devices such as HDDs, SSDs and other storage devices, to use 4K sectors. Many such devices still provide backward support to smaller sector sizes and emulate 512 byte sectors by performing read-modify-write operations internally. A set of data that is identified for data replication on a target computer may be organized and managed in subsets of data, or data blocks. The data blocks may be aligned to 512 byte sectors rather than aligned to 4 k sectors, where alignment refers to writing and/or reading a data block to/from a memory address having a size equal to some multiple of the size of the data block (e.g., 512 byte, 4096 byte, etc.). In these instances, the target computer may write the identified data blocks using significantly less efficient write operation (e.g., read-modify-write operations) which may greatly increase a number of input/output processes per second (IOPs) load on the device. The performance of a storage device may also be impacted when doing non-4K aligned I/O operations due to other reasons, depending on the device's internal architecture, including padding and/or inefficient seek operations. IOPs is a performance measurement used to characterize computer storage devices such as HDDs, solid state drives (SSDs), and storage area networks (SAN). Furthermore, alignment in the context of sectors of storage devices refers to a positioning, or starting offset, of various pieces of a storage device components (e.g., physical disk sectors). Accordingly, misaligned storage may lead to poor disk storage performance under various conditions.

Embodiments of the present invention may improve the efficiency of a storage device of a target computer. Embodiments of the present invention may identify data blocks for data replication and modify, or adjust, the size of the identified data blocks, based on load and/or performance statistics of the target computer and a network to reduce a number of IOPs performed by the storage device of the target system, thus reducing the load on the target system overall.

Embodiments of the present invention allow changing the balance between network load and the load generated on the target system's storage devices, and reduce the load on the target system at the cost of increasing the utilized network bandwidth dynamically by aligning write operations to comport with a respective memory address size (e.g., 4K sectors rather than to 512 b sectors). In such a manner, the actual network overhead increase may vary depending on the write patterns on the source system, and in some cases may not increase the overall network bandwidth utilization significantly.

Figure 1:
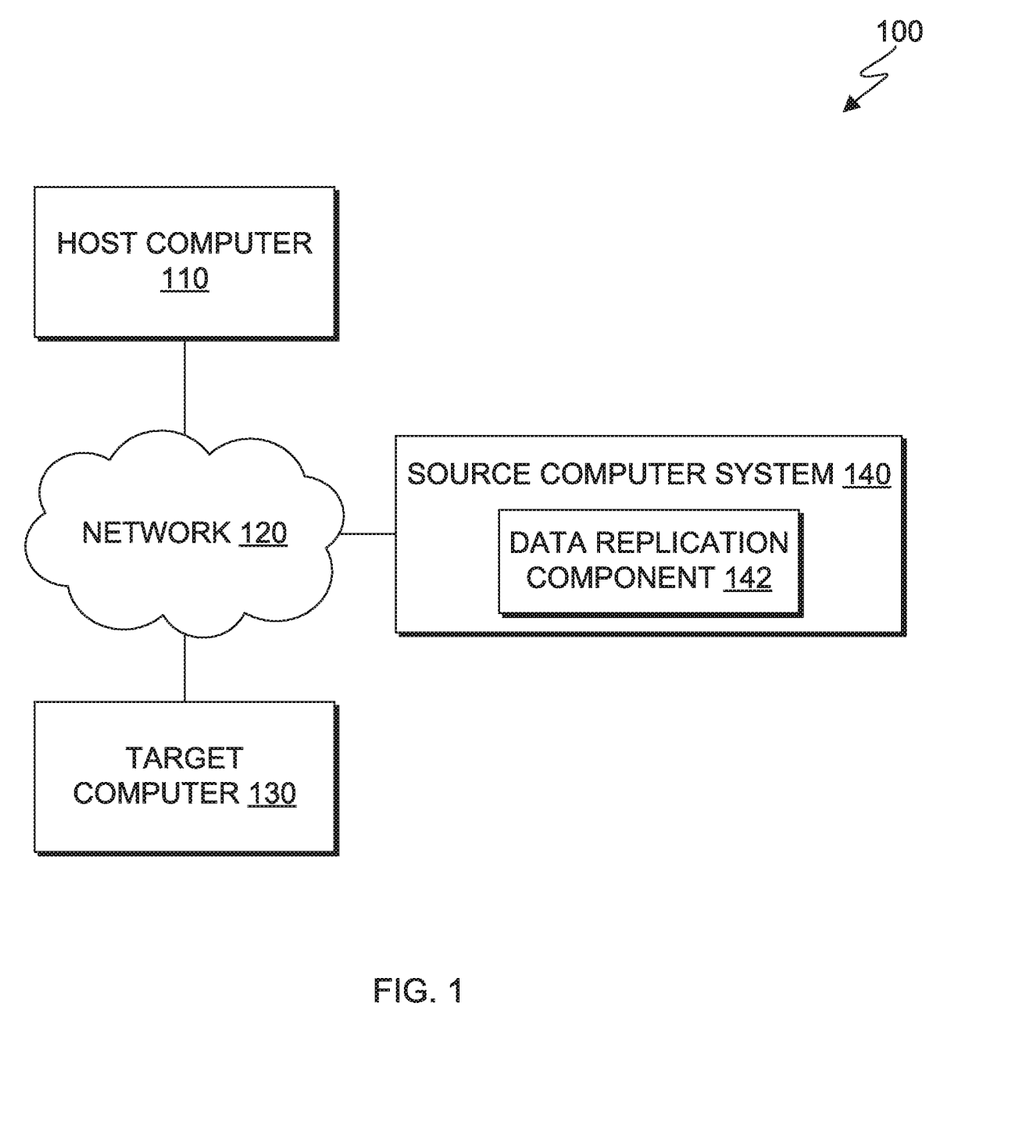
FIG. 1 is a functional block diagram illustrating a data replication environment, in accordance with an embodiment of the present invention.

FIG. 1 is a functional block diagram illustrating data replication environment 100, in accordance with an embodiment of the present invention. Data replication environment 100 may be used for asynchronous database mirroring, data backup/migration during disaster recovery, or another snapshot-based replication. In this embodiment, data replication environment 100 includes host computer 110, target computer 130, and source computer 140, all connected over network 120. In one example, host computer 110, target computer 130, and source computer 140 may be used in data center, cloud computing, storage area network (SAN), and network attached storage (NAS) applications. In certain embodiments, host computer 110, target computer 130, and source computer 140 represent virtual machines. In general, host computer 110, target computer 130, and source computer 140 are representative of any electronic devices, or combination of electronic devices, capable of executing machine-readable program instructions, in accordance with an embodiment of the present invention, as described in greater detail with regard to FIG. 4. In other embodiments, host computer 110, target computer 130, and source computer 140 may be implemented in a cloud computing environment, as described in greater detail with regard to FIGS. 5 and 6.

Although the following discussion involves storage devices in the context of HDDs and 4 k sectors which may rely on inefficient write operations (e.g., read-modify-write) and efficient write operations (e.g., modify operations), it should be understood that target computer 130 and source computer 140 may implement other types of storage devices. For example, with a different type of media the optimal alignment of data blocks that may be written efficiently may be different (e.g., 8K, 1 MB, etc.). In addition to IOPs, other factors may be taken into consideration to decide on an optimal data block size, such as write-multiplication factor in flash media based systems.

Network 120 may be, for example, a local area network (LAN), a wide area network (WAN) such as the Internet, or a combination of the two, and include wired, wireless, or fiber optic connections. In general, network 120 may be any combination of connections and protocols that will support communications between host computer 110, source computer 140 and target computer 130, in accordance with an embodiment of the invention.

Host computer 110 represents a platform configured to read data from and/or write data to source computer 140. Host computer 110 may be a desktop computer, a laptop computer, a specialized computer server, or any other computer system known in the art. In certain embodiments, host computer 110 represents a computer system utilizing clustered computers and components to act as a single pool of seamless resources when accessed through network 120. In certain embodiments, host computer 110 may execute read/write requests that may not be aligned to 4 k sectors of a storage device (not depicted) in source computer 140.

Source computer 140 represents a platform configured to receive read/write requests from host computer 110 and includes data replication component 142 which is one or more programs and/or applications configured to replicate data stored by a storage device of source computer 140 to target computer 130 over network 120. Source computer 140 may be a desktop computer, a laptop computer, a specialized computer server, or any other computer system known in the art. In certain embodiments, source computer 140 represents a computer system utilizing clustered computers and components to act as a single pool of seamless resources when accessed through network 120. In one embodiment, source computer 140 may be considered a 'master computer system' that periodically takes snapshots of data stored therein. A snapshot is a logical volume reflecting the contents (i.e., data) of a given source volume at a specific point-in-time. For example, IBM® XIV® Storage System uses advanced snapshot mechanisms to create a number of volume copies without impacting performance. Snapshot taking and management are based on a mechanism of internal pointers that allow the master volume and its snapshots to use a single copy of data for all portions that have not been modified, such that the snapshots are available to other applications and computing devices involved in data analysis, data protection, and data replication. Furthermore, data replication component 142 may evaluate two snapshots that were captured during immediately successive time intervals to identify differences in content (i.e., data) between the two snapshots. Accordingly, data replication component 142 may transmit the identified differences in data as either modified data blocks or unmodified data blocks to target computer 130 as part of a data replication process.

Data replication component 142 is also configured to monitor load statistics of target computer 130 and network 120, and modify data block sizes based on the monitored statistics. For example, data replication component 142 may identify data blocks to transfer (e.g., transmit over network 120) to target computer 130 which are selected to a data block size optimal for write performance by a storage device of target computer 130 (e.g., could be a size of 4 k for 512 byte emulating HDD-based systems, or 8 k for other types of storage media systems). Furthermore, data replication component 142 may modify or create data blocks which are aligned to a data block size optimal for write performance by a storage device of target computer 130. Data replication component 142 may also modify data block sizes based on network 120 and target computer 130 load and/or performance statistics, such as optionally reducing data block size to smaller units to reduce network 120 bandwidth, or alternatively to increase data block size to improve IOP.

For example, one or more changes to a data set stored in source computer 140 may be identified for data replication to target computer 130, where the data set is 1 megabyte (MB). In this example, data replication component 142 may divide, or partition, the 1 MB data set into data blocks including the one or more changes of varying sizes as a function of an alignment overhead of a storage device of target computer 130, network 120 load, and/or target computer 130 performance. Furthermore, data replication component 142 may determine whether to transfer the entire data set or a portion of the data set, based on an amount of changed data in the data set, and whether the amount of changed data may be partitioned, or divided, into data block sizes for optimal write operations performed by target computer 130. Stated differently, data replication component 142 may determine whether the sizes of data blocks including the one or more changes to the data set are optimized for efficient write operations, and based on this determination data replication component 142 may further determine whether to pass a greater or lesser portion of the data set to target computer 130. If, in this example, over 90% of the 1 MB data set has changed, and those changes are identified for data replication, then instead of passing only the identified changes to target computer 130, data replication component 142 may pass the entire 1 MB for data replication regardless of network 120 load to reduce a number inefficient or suboptimal write operations performed by target computer 130. If, in this example, less than 1% of the of the 1 MB data set has changed, and those changes are identified for data replication, then data replication component 142 may modify data block sizes which include the identified changes to a data block size of 4 k. If, in this example, data replication component 142 passes the identified changes using data blocks having data block sizes of 512 bytes, then the load of network 120 may be reduced and a number inefficient or suboptimal write operations performed by target computer 130 may increase, thus increasing the load of target computer 130.

Target computer 130 represents a platform configured to receive data blocks from source computer 140 and components therein over network 120 during a data replication process. Target computer 130 may be a desktop computer, a laptop computer, a specialized computer server, or any other computer system known in the art. In certain embodiments, target computer 130 represents a computer system utilizing clustered computers and components to act as a single pool of seamless resources when accessed through network 120. In one embodiment, target computer 130 may be considered a 'slave computer system' that is operatively coupled to source computer 140 via Fibre Channel (FC) or Internet Small Computer Systems Interface (iSCSI). In one embodiment, if a received data block is not aligned with an optimal size for write operation performed by a storage device of target computer 130, then target computer 130 may implement a less-than-optimal, or relatively inefficient write operation, such as read-modify-write, copy-on-write, redirect-on-write, or another write operation. In another embodiment, if a received data block is aligned with an optimal size for write operation performed by a storage device of target computer 130, then target computer 130 may implement a relatively efficient write operation such as modify write operation.

Figure 2:
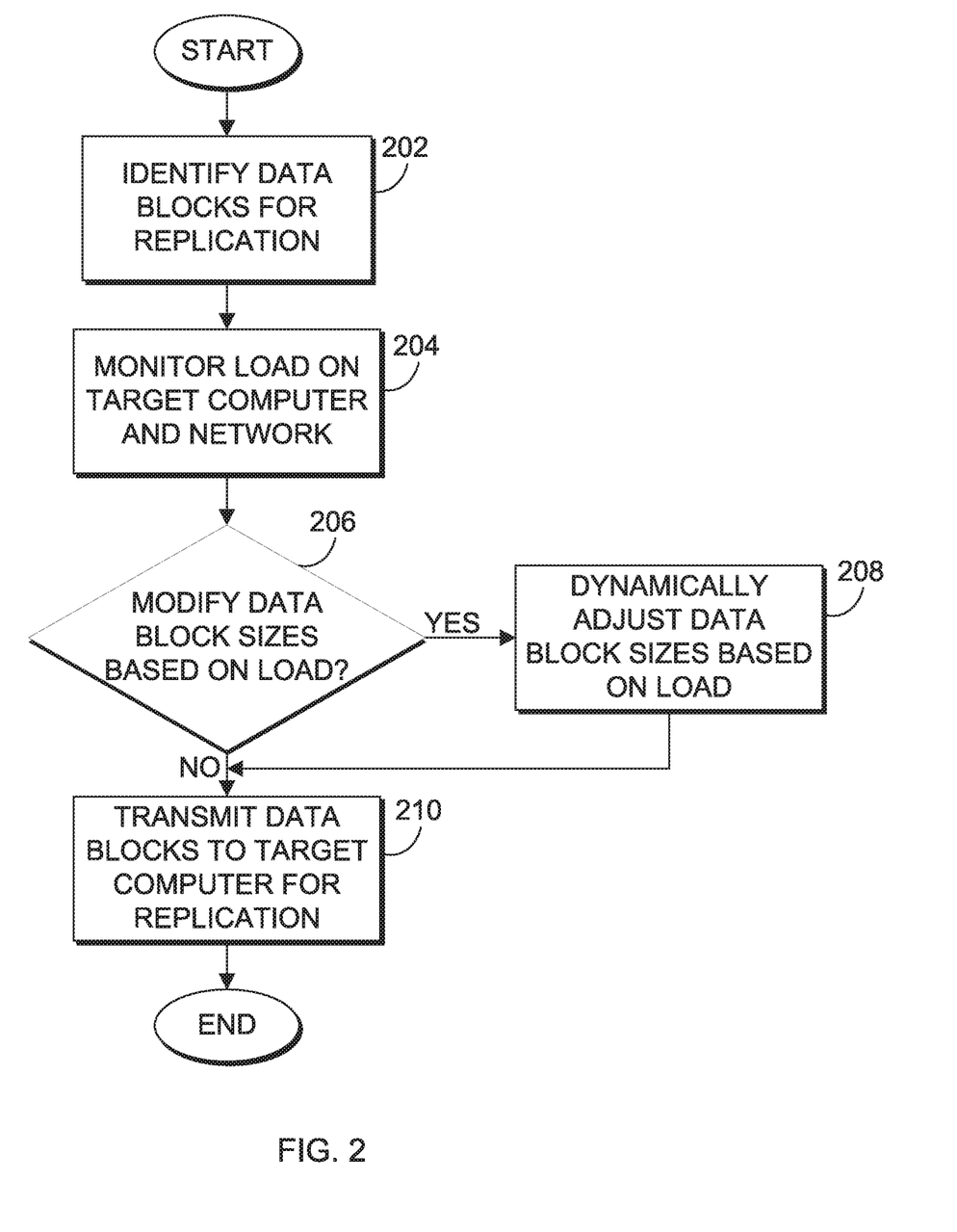
FIG. 2 is a flowchart illustrating operational steps for transmitting data blocks identified for data replication, in accordance with an embodiment of the present invention.

FIG. 2 is a flowchart illustrating operational steps for transmitting data blocks identified for data replication, in accordance with an embodiment of the present invention. In this embodiment, the operational steps for transmitting data blocks identified for data replication is performed by data replication component 142. In one embodiment, host computer 110 changes data stored on source computer 140, and those changes may be required to be passed to target computer 130 as part of a data replication process.

Data replication component 142 identifies data blocks for a data replication process (step 202). As previously discussed, source computer 140 may be an IBM® XIV® Storage System that utilizes snapshots, and data replication component 142 identifies data blocks for data replication by comparing a latest (i.e., most recent) snapshot that was synchronized by target computer 130 with the most recently captured snapshot of source computer 140. In one embodiment, data replication component 142 may identify data block-level updates required for data replication by identifying differences from a latest synchronized snapshot and a most recently captured snapshot, similar to the program functionality provided by NetApp® SnapMirror®.

During the data replication process, data replication component 142 monitors load statistics of target computer 130 and network 120 (step 204). In one embodiment, data replication component 142 may implement a network traffic monitor to monitor load and/or performance statistics of network 120 (e.g., network 120 bandwidth utilization, packet information, etc.). In another embodiment, data replication component 142 may implement an SAN/NAS management performance monitor to monitor load and/or performance statistics for the storage device of target computer 130 (e.g., transfers per second, read/writes per second, etc.), as well as other resource monitors to monitor other load and/or performance statistics of target computer 130 (e.g., CPU utilization, processor queue length, etc.).

Subsequently, data replication component 142 determines whether to modify the identified data blocks based on the load and/or performance statistics of target computer 130 and network 120 (decision 206). For example, data replication component 142 may reduce a size of data blocks. For example, data replication component 142 may determine that network 120 load is above a specified threshold (e.g., network 120 bandwidth utilization is greater than a specified threshold) and decrease data block sizes based on that determination. In another example, data replication component 142 may determine that target computer 130 backend is not loaded based on another specified threshold (e.g., a number of outstanding I/O requests is greater than a specified threshold), and increase data block sizes based on that determination.

If data replication component 142 determines to modify the identified data blocks based on the load and/or performance statistics target computer 130 and network 120 ('yes' branch, decision 206), then data replication component 142 dynamically adjusts, modifies, or creates, data block sizes based on the monitored load and/or performance statistics (step 208). For example, if target computer 130 is idling, then data replication component 142 may reduce the size of data blocks to conserve network 120 bandwidth. If target computer 130 is overloaded, then data replication component 142 may consider larger data block sizes, such that the transmission of the larger data block sizes over network 120 does not exceed a specified threshold for network 120 bandwidth utilization. In another example, an IBM® XIV® Generation-3 Storage System may prefer to write data blocks with sizes of 1 MB, if a snapshot indicates that a majority of data blocks have changed (i.e., no redirect-on-write is needed on target computer 130 because the entire snapshot 'partition' is replaced), otherwise target computer 130 may prefer to receive data blocks with sizes of 4096 bytes in instances where 4K physical sectors are used. Furthermore, in instances where network 120 performance is of the highest priority compared to an HDD performance of target computer 130, then 512 byte data blocks may be considered.

If data replication component 142 determines to not modify the identified data blocks based on the load and/or performance statistics of target computer 130 and network 120 ('no' branch, decision 206), data replication component 142 transmits the identified data blocks to target computer 130 to proceed with the data replication process (step 210). Furthermore, subsequent to data replication component 142 adjusting the size of data blocks based on load and/or performance statistics, data replication component 142 transmits the adjusted data blocks to target computer 130 to proceed with the data replication process.

Figure 3:
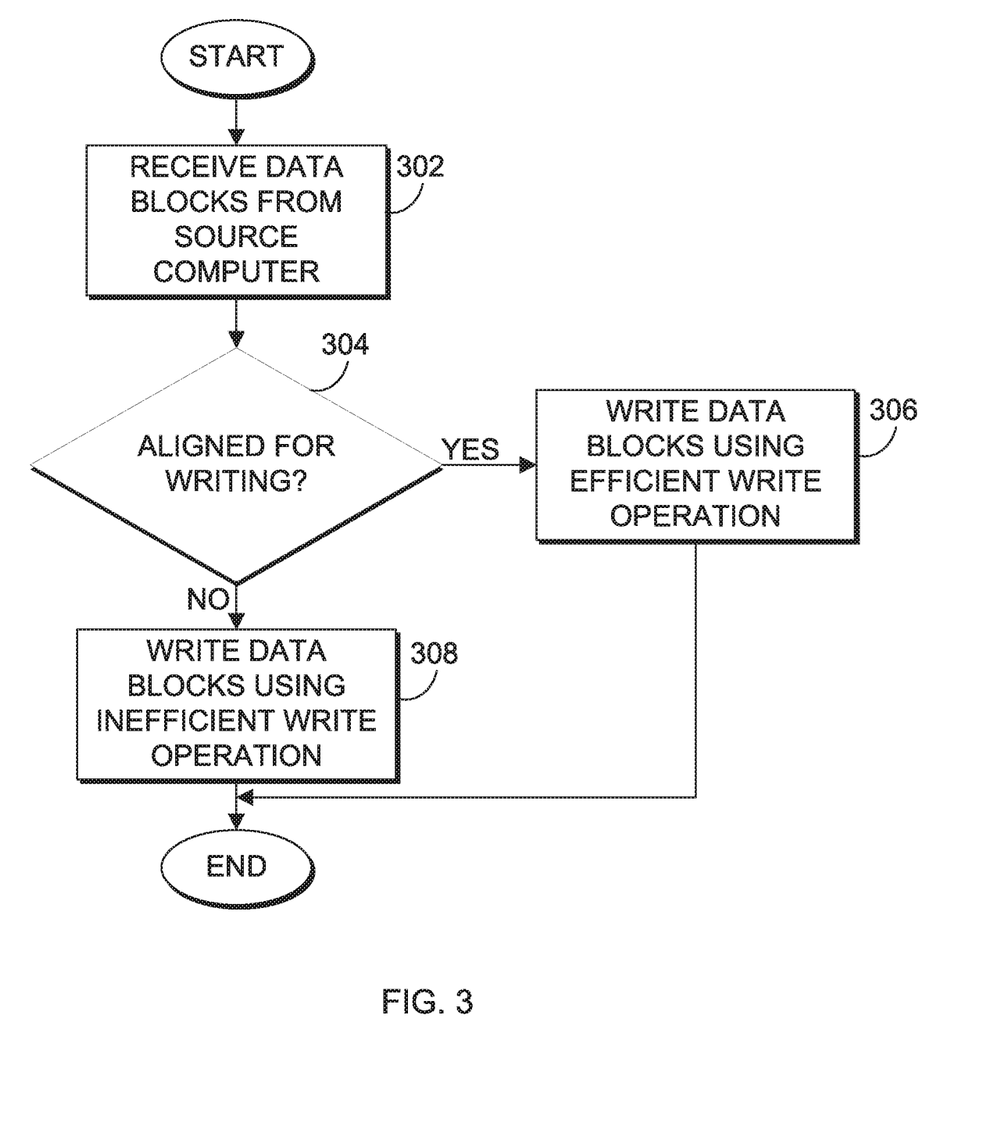
FIG. 3 is a flowchart illustrating operational steps for writing data blocks identified for data replication, in accordance with an embodiment of the present invention.

FIG. 3 is a flowchart illustrating operational steps for writing data blocks identified for data replication, in accordance with an embodiment of the present invention. In this embodiment, the operational steps described herein are performed by target computer 130, subsequent to source computer 140 transmitting data blocks for data replication over network 120, as previously described with regard to FIG. 2. Target computer 130 receives data blocks for a data replication process from source computer 140 (step 302).

Target computer 130 then determines whether the received data blocks are aligned for optimal or efficient write operations (decision 304). In one embodiment, target computer 130 determines whether the received data bocks are aligned if the received data blocks may be written to a memory address of the storage device having a size equal to some multiple of the sizes of the data blocks.

If target computer 130 determines that the received data blocks are aligned for optimal or efficient write operations ('yes' branch, decision 304), then target computer 130 writes the received data blocks using an efficient write operation, as previously described (step 306). For example, if the storage device of target computer 130 is an HDD and it is determined that the received data blocks are aligned for optimal or efficient write operations, then target computer 130 may perform modify operations to write the data blocks.

If target computer 130 determines that the received data blocks are not aligned for optimal or efficient write operations ('no' branch, decision 304), then target computer 130 writes the received data blocks using a relatively inefficient write operation, as previously described (step 308). For example, if the storage device of target computer 130 is an HDD and it is determined that the received data blocks are not aligned for optimal or efficient write operations, then target computer 130 may perform read-modify-write operations to write the data blocks.

Figure 4:
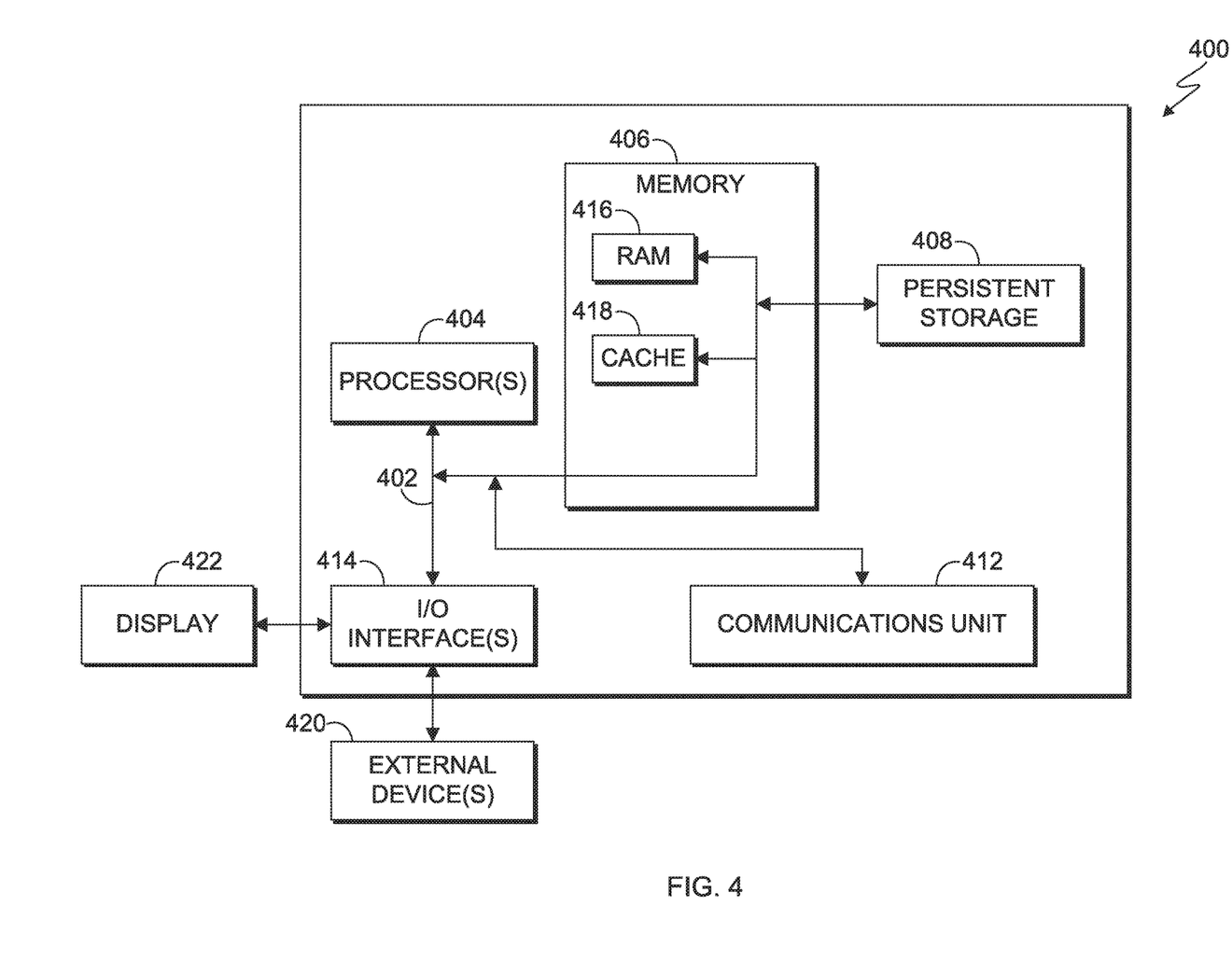
FIG. 4 is a block diagram of internal and external components of the computer systems of FIG. 1, in accordance with an embodiment of the present invention.

FIG. 4 is a block diagram of internal and external components of a computer system 400, which is representative host computer 110, target computer 130, and source computer 140 of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display4 provides a mechanism to display data to a user and can be, for example, a computer monitor. Display 422 can also be an incorporated display and may function as a touch screen, such as a built-in display of a tablet computer.

Figure 5:
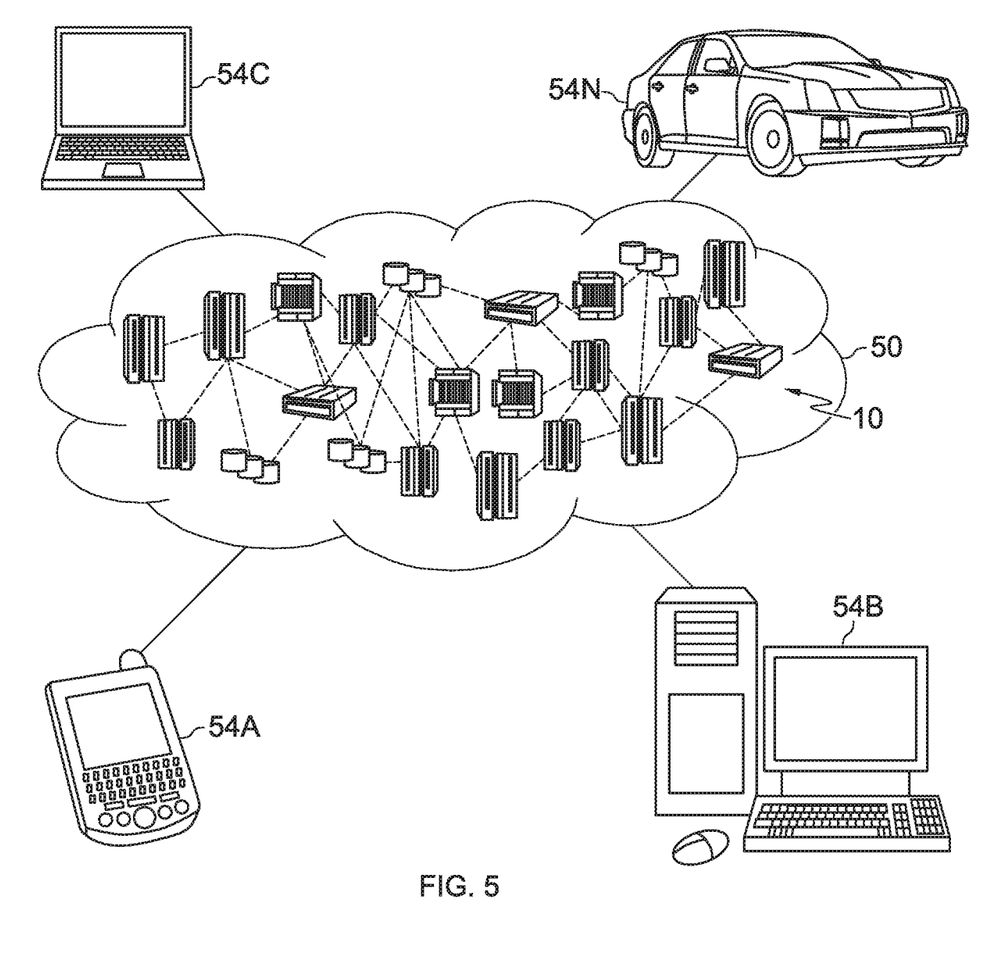
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 6:
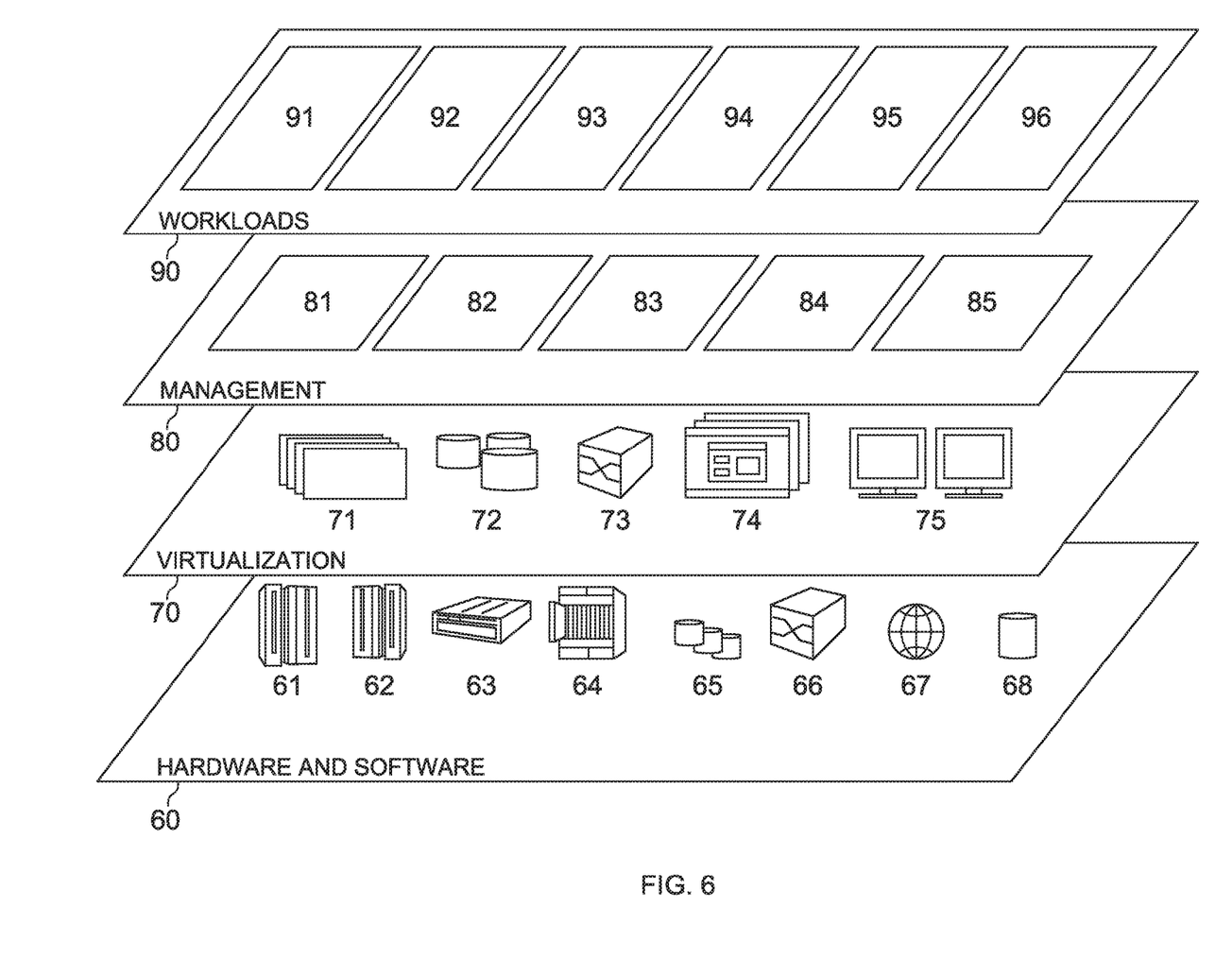
FIG. 6 depicts abstraction model layers, in accordance with an embodiment of the present invention.

Referring now to FIG. 6, a set of functional abstraction layers provided by cloud computing environment 50 (FIG. 5) is shown. The components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data replication environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

initiating, by one or more computer processors, an asynchronous data replication process between a source computer and a target computer over a network;

monitoring, using the source computer, at least one storage device performance of a storage device of the target computer to determine whether a target computer load is greater than a first specified threshold;

monitoring, using the source computer, at least one network performance to determine whether a network load is greater than a second specified threshold;

in response to comparing, using the source computer, a most recent snapshot of a data stored on the source computer with a previous snapshot of the data stored on the source computer, identifying, by the one or more computer processors, at least one difference between the most recent snapshot of the data stored in the source computer and the previous snapshot of the data stored in the source computer, wherein the at least one identified difference includes at least one portion of data stored on the source computer for the asynchronous data replication process between the source computer and the target computer, wherein the at least one portion of data is organized in a data block; and responsive to determining, based on the monitored at least one storage device performance of the target computer, that the target computer load is greater than the first specified threshold, increasing, using the source computer, a size of the data block associated with the at least one identified difference for the asynchronous data replication process between the source computer and the target computer over the network, wherein the increased size of the data block is aligned to an optimal data block size for efficient write operation by the storage device of the target computer to reduce a number of Input/Output operations per second (IOPs) performed by the target computer and decrease the target computer load, wherein the increased size of the data block increases the network load, and wherein the network load is increased to not exceed the second specified threshold associated with the network load.

2. The method of claim 1, further comprising:

responsive to determining that the data block received by the target computer is the optimal data block size for the storage device, writing, by the one or more computer processors, the data block to the storage device using a first writing operation; and responsive to determining that the data block received by the target computer is not the optimal data block size for the storage device, writing, by the one or more computer processors, the data block to the storage device using a second writing operation.

3. The method of claim 1, further comprising:

wherein the monitored at least one network performance of the network includes monitoring a network bandwidth utilization, and wherein the monitored at least one storage device performance of the storage device includes monitoring the number of IOPS.

4. The method of claim 2, wherein determining whether the data block received by the target computer is the optimal data block size for the storage device comprises:

determining, by the one or more computer processors, whether a memory address of the storage device has a memory size equal to a multiple of a memory size of the data block.

5. The method of claim 2, wherein the first writing operation is performed using a modify operation, and wherein the second writing operation is performed using a redirect-on-write operation.

6. The method of claim 3, further comprising:

responsive to determining that the network load is greater than the second specified threshold, decreasing, by the one or more computer processors, the size of the data block, wherein the decreased size of the data block is not equal to the optimal data block size for the storage device, and wherein the data block having the decreased size of the data block is written to the storage device using the second writing operation.

7. The method of claim 6, wherein decreasing the size of the data block increases the number of IOPs performed by the storage device for writing the data block and decreases the network utilization bandwidth.

8. A computer program product comprising:

one or more computer readable storage media and program instructions stored on the one or more computer readable storage media, the program instructions comprising:

program instructions to initiate an asynchronous data replication process between a source computer and a target computer over a network;

program instructions to monitor, using the source computer, at least one storage device performance of a storage device of the target computer to determine whether a target computer load is greater than a first specified threshold;

program instructions to monitor, using the source computer, at least one network performance to determine whether a network load is greater than a second specified threshold;

program instructions to, in response to comparing, using the source computer, a most recent snapshot of a data stored on the source computer with a previous snapshot of the data stored on the source computer, identify, by the one or more computer processors, at least one difference between the most recent snapshot of the data stored in the source computer and the previous snapshot of the data stored in the source computer, wherein the at least one identified difference includes at least one portion of data stored on the source computer for the asynchronous data replication process between the source computer and the target computer, wherein the at least one portion of data is organized in a data block; and program instructions to, responsive to determining, based on the monitored at least one storage device performance of the target computer, that the target computer load is greater than the first specified threshold, increasing, using the source computer, a size of the data block associated with the at least one identified difference for the asynchronous data replication process between the source computer and the target computer over the network, wherein the increased size of the data block is aligned to an optimal data block size for efficient write operation by the storage device of the target computer to reduce a number of Input/Output operations per second (IOPs) performed by the target computer and decrease the target computer load, wherein the increased size of the data block increases the network load, and wherein the network load is increased to not exceed the second specified threshold associated with the network load.

9. The computer program product of claim 8, wherein the program instructions stored on the one or more computer readable storage media further comprises:
program instructions to, responsive to determining that the data block received by the target computer is the optimal data block size for the storage device, write the data block to the storage device using a first writing operation; and
program instructions to, responsive to determining that the data block received by the target computer is not the optimal data block size for the storage device, write the data block to the storage device using a second writing operation.

10. The computer program product of claim 8, wherein the program instructions stored on the one or more computer readable storage media further comprises:
wherein the monitored at least one network performance of the network includes monitoring a network bandwidth utilization, and wherein the monitored at least one storage device performance of the storage device includes monitoring the number of IOPS.

11. The computer program product of claim 9, wherein the program instructions to determine whether the data block received by the target computer is the optimal data block size for the storage device comprises:
program instructions to determine whether a memory address of the storage device has a memory size equal to a multiple of a memory size of the data block.

12. The computer program product of claim 9, wherein the first writing operation is performed using a modify operation, and wherein the second writing operation is performed using a redirect-on-write operation.

13. The computer program product of claim 10, wherein the program instructions stored on the one or more computer readable storage media further comprises:
program instructions to, responsive to determining that the network load is greater than the second specified threshold, decrease the size of the data block, wherein the decreased size of the data block is not equal to the optimal data block size for the storage device, and wherein the data block having the decreased size of the data block is written to the storage device using the second writing operation.

14. The computer program product of claim 13, wherein the program instructions to decrease the size of the data block increases the number of IOPs performed by the storage device for writing the data block and decreases the network utilization bandwidth.

15. A computer system comprising:
one or more computer processors;
one or more computer readable storage media;
program instructions stored on the one or more computer readable storage media for execution by at least one of the one or more processors, the program instructions comprising:
program instructions to initiate an asynchronous data replication process between a source computer and a target computer over a network;
program instructions to monitor, using the source computer, at least one storage device performance of a storage device of the target computer to determine whether a target computer load is greater than a first specified threshold;
program instructions to monitor, using the source computer, at least one network performance to determine whether a network load is greater than a second specified threshold;
program instructions to, in response to comparing, using the source computer, a most recent snapshot of a data stored on the source computer with a previous snapshot of the data stored on the source computer, identify, by the one or more computer processors, at least one difference between the most recent snapshot of the data stored in the source computer and the previous snapshot of the data stored in the source computer, wherein the at least one identified difference includes at least one portion of data stored on the source computer for the asynchronous data replication process between the source computer and the target computer, wherein the at least one portion of data is organized in a data block; and
program instructions to, responsive to determining, based on the monitored at least one storage device performance of the target computer, that the target computer load is greater than the first specified threshold, increasing, using the source computer, a size of the data block associated with the at least one identified difference for the asynchronous data replication process between the source computer and the target computer over the network, wherein the increased size of the data block is aligned to an optimal data block size for efficient write operation by the storage device of the target computer to reduce a number of Input/Output operations per second (IOPs) performed by the target computer and decrease the target computer load, wherein the increased size of the data block increases the network load, and wherein the network load is increased to not exceed the second specified threshold associated with the network load.

16. The computer system of claim 15, wherein the program instructions stored on the one or more computer readable storage media further comprises:
program instructions to, responsive to determining that the data block received by the target computer is the optimal data block size for the storage device, write the data block to the storage device using a first writing operation; and
program instructions to, responsive to determining that the data block received by the target computer is not the optimal data block size for the storage device, write the data block to the storage device using a second writing operation.

17. The computer system of claim 15, wherein the program instructions stored on the one or more computer readable storage media further comprises:
wherein the monitored at least one network performance of the network includes monitoring a network bandwidth utilization, and wherein the monitored at least one storage device performance of the storage device includes monitoring the number of IOPS.

18. The computer system of claim 16, wherein the program instructions to determine whether the data block received by the target computer is the optimal data block size for the storage device comprises:

program instructions to determine whether a memory address of the storage device has a memory size equal to a multiple of a memory size of the data block.

19. The computer system of claim 16, wherein the first writing operation is performed using a modify operation, and wherein the second writing operation is performed using a redirect-on-write operation.

20. The computer system of claim 17, wherein the program instructions stored on the one or more computer readable storage media further comprises:

program instructions to, responsive to determining that the network load is greater than the second specified threshold, decrease the size of the data block, wherein the decreased size of the data block is not equal to the optimal data block size for the storage device, and wherein the data block having the decreased size of the data block is written to the storage device using the second writing operation.

* * * * *